(12) United States Patent
Dolgov et al.

(10) Patent No.: US 10,313,477 B2
(45) Date of Patent: Jun. 4, 2019

(54) SYSTEM AND METHOD FOR USE OF A NON-BLOCKING PROCESS WITH A RESOURCE POOL IN A COMPUTING ENVIRONMENT

(71) Applicant: Oracle International Corporation, Redwood Shores, CA (US)

(72) Inventors: Yuri Dolgov, San Jose, CA (US); Douglas Surber, Orinda, CA (US); Jean De Lavarene, Levallois Perret (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 35 days.

(21) Appl. No.: 15/215,372

(22) Filed: Jul. 20, 2016

(65) Prior Publication Data

US 2017/0026242 A1 Jan. 26, 2017

Related U.S. Application Data

(60) Provisional application No. 62/194,734, filed on Jul. 20, 2015.

(51) Int. Cl.
*H04L 29/08* (2006.01)
(52) U.S. Cl.
CPC .............. *H04L 67/32* (2013.01); *H04L 67/14* (2013.01)
(58) Field of Classification Search
CPC ................................ H04L 67/32; H04L 67/14
See application file for complete search history.

(56) References Cited

U.S. PATENT DOCUMENTS

| | | | | |
|---|---|---|---|---|
| 7,418,506 | B1 * | 8/2008 | Achtermann | G06F 9/5055 709/222 |
| 8,966,494 | B2 * | 2/2015 | Makljenovic | G06F 9/526 710/200 |
| 2006/0225077 | A1 * | 10/2006 | Anderson | G06F 9/526 718/104 |

(Continued)

OTHER PUBLICATIONS

"An Introduction to Lock-Free Programming", published Jun. 12, 2012, http://preshing.com/20120612/an-introduction-o-lock-free-programming, 12 pages.

(Continued)

*Primary Examiner* — Jerry B Dennison
(74) *Attorney, Agent, or Firm* — Tucker Ellis LLP

(57) ABSTRACT

In accordance with an embodiment, described herein is a system and method for use of a non-blocking process with a resource pool, for example a connection pool, or another type of computing environment. A generic wait-free approach can be used with a variety of different types of resource pools and pool elements. Threads which require access to a collection of resources do not have to wait for a lock on that collection of resources to become available. Although a borrowing thread may still be required to wait for a particular resource to be released, the wait-free approach allows the thread to browse through a list of available resources. The approach can be used with connection pools, or with other types of computing environments, to provide improved scalability in such systems.

20 Claims, 16 Drawing Sheets

(56) References Cited

U.S. PATENT DOCUMENTS

| | | | | |
|---|---|---|---|---|
| 2009/0137228 A1* | 5/2009 | Horn | ............... | H04W 48/02 |
| | | | | 455/411 |
| 2009/0172687 A1* | 7/2009 | Bobak | ............... | G06Q 10/06 |
| | | | | 718/104 |
| 2014/0172790 A1* | 6/2014 | Pathak | ............ | G06F 17/30575 |
| | | | | 707/613 |
| 2017/0026242 A1* | 1/2017 | Dolgov | ............. | H04L 67/14 |
| 2018/0150337 A1 | 5/2018 | Dolgov et al. | | |

OTHER PUBLICATIONS

"Connection Management Strategies for Java Applications using JDBC and UCP", Oracle Database 12c, Oracle White Paper, Jun. 2016, 30 pages.

Michael, et al., "Simple, Fast, and Practical Non-Blocking and Blocking Concurrent Queue Algorithms", Department of Computer Science, University of Rochester, 1996, 9 pages.

"Non-blocking algorithm", Wikipedia, https://en.wikipedia.org/w/index.php?title=Non-bocking_algorithm&oldid=667580799, Jun. 19, 2015, 4 pages.

* cited by examiner

SYSTEM AND METHOD FOR USE OF A NON-BLOCKING PROCESS WITH A RESOURCE POOL IN A COMPUTING ENVIRONMENT

CLAIM OF PRIORITY

This application claims the benefit of priority to U.S. Provisional patent application titled "SYSTEM AND METHOD FOR USE OF A NON-BLOCKING PROCESS WITH A CONNECTION POOL OR OTHER COMPUTING ENVIRONMENT", Application No. 62/194,734, filed Jul. 20, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Field of Invention

Embodiments of the invention are generally related to computer processing, and are particularly related to a system and method for use of a non-blocking process with a resource pool, for example a connection pool, or another type of computing environment.

Background

In many computing environments, resource pools can be used to provide access to resources which merit caching, since recreating those resources would be computationally expensive. Some examples of resource pools, and their pool elements, include database connections, memory buffers, or sections of memory that are computationally expensive to allocate.

For example, in an application server or other computing environment that includes a database connection pool, such as an Oracle Universal Connection Pool (UCP) environment, the connection pool acts as a resource pool that caches database connections, with each connection pool element associated with a corresponding software object that defines a connection. A software application can request a particular type of connection, and, if the connection pool includes a connection that can satisfy the request, that connection can be provided to the application in the form of access to the appropriate software object. The application can use the connection to perform some work, and then return it to the connection pool, so that it can be made available for subsequent requests, from the same or another application.

However, while some environments can synchronize access to a cache of many connections (for example, a first thread A may release a connection to the pool, while another thread B searches for a best connection in the pool), such model generally does not scale well. With software applications increasingly being deployed to larger enterprise or cloud environments, such systems can benefit in being able to scale, to support much larger numbers of threads.

SUMMARY

In accordance with an embodiment, described herein is a system and method for use of a non-blocking process with a resource pool, for example a connection pool, or another type of computing environment. A generic wait-free approach can be used with a variety of different types of resource pools and pool elements. Threads which require access to a collection of resources do not have to wait for a lock on that collection of resources to become available. Although a borrowing thread may still be required to wait for a particular resource to be released, the wait-free approach allows the thread to browse through a list of available resources. The approach can be used with connection pools, or with other types of computing environments, to provide improved scalability in such systems.

DETAILED DESCRIPTION

Figure 1:
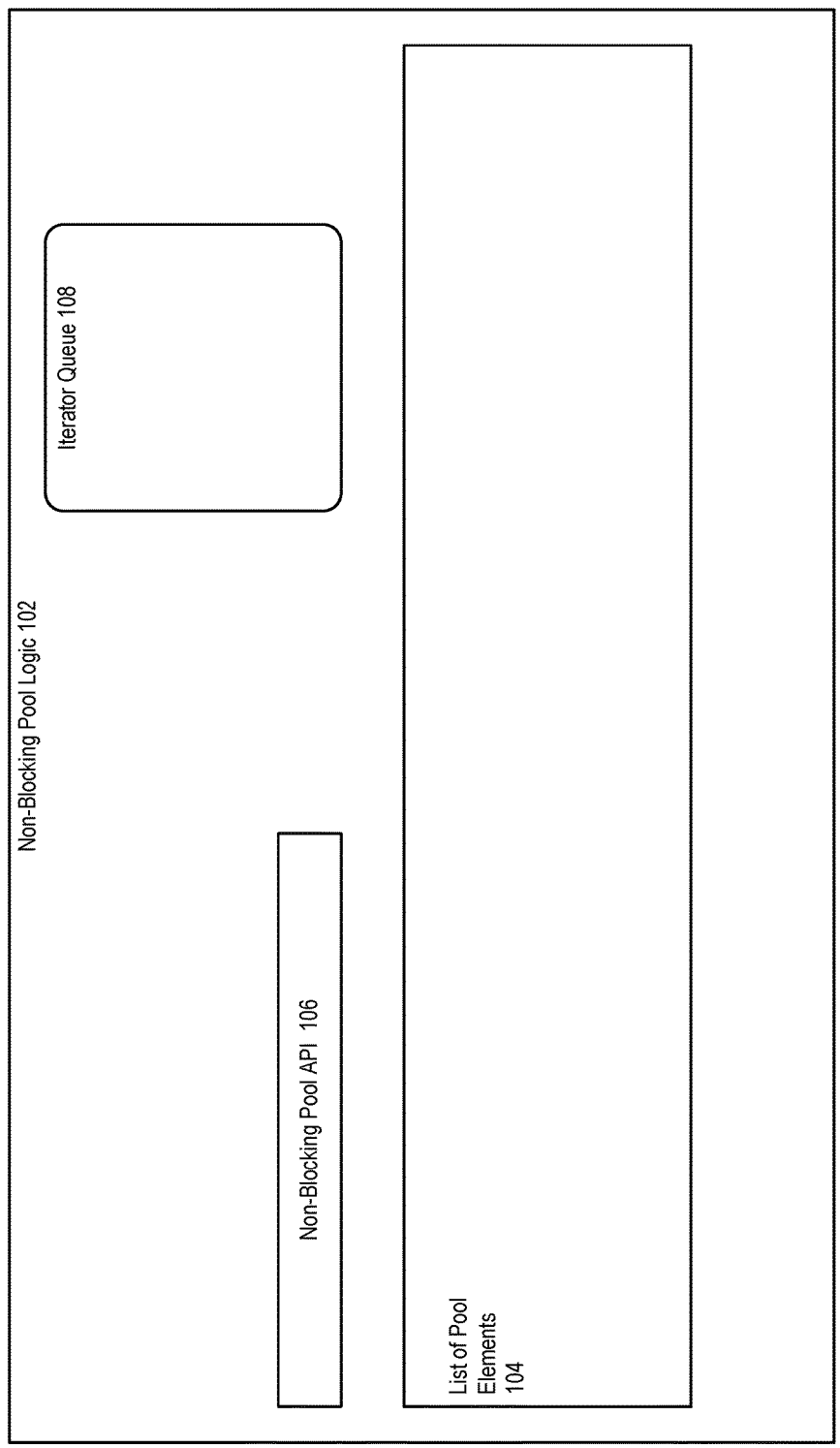
FIG. 1 illustrates use of a non-blocking process, in accordance with an embodiment.

As described above, in many computing environments, resource pools can be used to provide access to resources which merit caching, since recreating those resources would be computationally expensive. Some examples of resource pools, and pool elements, include database connections, memory buffers, or sections of memory that are computationally expensive to allocate.

In accordance with an embodiment, described herein is a system and method for use of a non-blocking process with a resource pool, for example a connection pool, or another type of computing environment. A generic wait-free approach can be used with a variety of different types of resource pools and pool elements. Threads which require access to a collection of resources do not have to wait for a lock on that collection of resources to become available. Although a borrowing thread may still be required to wait for a particular resource to be released, the wait-free approach allows the thread to browse through a list of available resources. The approach can be used with connection pools, or with other types of computing environments, to provide improved scalability in such systems.

For example, in accordance with an embodiment, the system enables a pool element that is associated with a data or other resource, to be reserved in a reliable manner, such that only one thread has entire access to that particular element for the duration of the reservation. During the reservation, other threads will be prevented from accessing that particular pool element. However, the reservation of a particular pool element by a thread, for the purpose of determining the suitability of its associated data or other resource, does not prevent those other threads from navigating through the remainder of the pool, potentially reserving and examining other pool elements.

Introduction to Resource Pools

In accordance with an embodiment, a pool can be viewed as a concurrent programmatic logic that manages pool elements and supports basic operations such as: insert a pool element into the pool; remove a pool element from the pool; and iterate through the pool seeking a specific pool element. Pools can be used to manage access to data or other types of resources, in which case they are generally referred to herein as resource pools.

As described above, some examples of resource pool elements include database connections, memory buffers, or sections of memory that are computationally expensive to allocate. However, a resource pool can also be generalized, such that any object of any class can be considered a pool element.

Although some aspects of this functionality can be implemented using critical sections in the software application code, such an approach can lead to performance and scalability limitations. A critical section, for example one which finally translates into monitorenter and monitorexit Java virtual machine (JVM) pseudo code instructions, forces threads to wait to enter a monitor process, where those waiting threads are subject to thread re-scheduling and context-switching. Additionally, the critical section generally prevents other threads from performing work while one thread is within the critical section, which results in poor scaling performance when greater number of threads require access to the pool.

For example, in a connection pool environment that provides access to a connection pool or cache using a critical section, when a thread requests a connection, the connection pool or cache is generally locked, to find a best connection and return it, while other threads that may also want a connection are forced to wait.

As another example, a procedure to increment a counter may be configured to get a particular value, add "1" to it, and store the new value. Since multiple threads accessing the counter at the same time could cause corruption, the counter can be provided as a critical section, so that only a single thread can enter it at a time, to access the blocked data, while other threads are placed in a queue waiting. Context-switching can be used to idle and wake threads as they enter the critical section, which effectively operates as an atomic action by using several nonatomic actions.

The need for such blocking, queuing, and context-switching means that critical sections are often large, computationally expensive, operations. When a critical section is used in a multiprocessor environment, since only one thread is able to enter the critical section at a time, this means that other processors may remain idle while their threads are being held.

An alternative approach to the use of critical sections is to provide a wait-free, or lock-free, approach using a hardware operation such as compare-and-swap. In this approach, for example, a first thread can read a counter, increment it, and then perform a single hardware operation, which directs that, if the counter value is "X", then modify the content. Another thread can attempt the same operation, in such a manner that the winning thread wins, and the losing thread performs a re-read.

Since the above approach is performed as a single machine instruction, the likelihood of overlap is small. The threads can perform a while-loop, and spin while attempting to increment the counter; although in practice, with small operations, such operations do not spin very long. Since there is no queue and no context-switch, the timing is small compared with the hundreds of lines of code in a typical critical section.

Non-Blocking Process

As described above, with software applications increasingly being deployed to larger enterprise or cloud environments, such systems can benefit in being able to scale to support much larger numbers (e.g., thousands) of threads, such as, in the example of a connection pool, the ability to handle concurrent access to the connection cache by several threads.

In accordance with an embodiment, an additional pool operation is supported that allows a borrowing thread to reserve a pool element, so that the thread can inspect that pool element to make a determination as to whether the pool element should be subsequently borrowed.

As described herein, in accordance with an embodiment, the action of "reserving" a pool element generally means "reserve to inspect" the element, such that a thread reserves and inspects a particular element, because it is considering whether to borrow or otherwise use that particular element. Generally, a thread will reserve a pool element during a very short period of time. If the thread then determines to borrow the pool element, it will remove that element from the pool of available elements. The borrowed element leaves an empty cell in the resource pool, which can be used if necessary during a subsequent pool insert operation.

Additionally, in accordance with an embodiment, the resource pool is linearly-organized, including that the pool element reservation order is generally provided on a first-come-first-served basis for participating threads; threads are never blocked by reserved pool elements; and a participating thread has the option to revisit a reserved pool element when that pool element is released.

The described approach provides for reliability of a pool element's reservation, such that only a single thread will have entire access to a particular pool element for the duration of its reservation. During the period or duration of reservation, other threads will be prevented from accessing that particular pool element. However, the reservation of a particular pool element by a particular thread, for the purpose of determining the suitability of its associated data or other resource, will not prevent those other threads from navigating through the remainder of the pool, potentially reserving and examining other pool elements.

In accordance with an embodiment, the described approach implements a non-blocking process including the use of atomic references with compareAndSet operations, which can be translated into native hardware compare-and-swap spinlock instructions. This enables the system to avoid using monitorenter and monitorexit pseudocode instructions; and instead use spinlocks which are atomic references in Java.

In accordance with an embodiment, an atomic reference can be provided by a class in the Java class library that implements an update operation using compareAndSet. One means of accomplishing this is to set a value if something is null. For example, with Java this can be indicated as "if field-equals-null then field equals new-value". However, in a multithreaded environment, by the time a thread can complete this operation, another thread could have changed the value. To address, this, an atomic reference can be used to test equal-to-null and set to a new value that is performed at the hardware level, for example by determining a bit pattern that appears as null, and setting it to a bit pattern of the new value.

FIGS. 1-12 illustrate use of a non-blocking process, in accordance with an embodiment.

As illustrated in FIG. 1, in accordance with an embodiment, a system can include or provide a non-blocking pool logic 102, which when executed by a computer enables access to a resource pool or other list of pool elements 104, via a non-blocking pool application program interface (API) 106. The non-blocking pool logic also supports the use of an iterator queue 108, as further described below.

In accordance with an embodiment, each pool element within the list of pool elements can be associated with a chunk or region of memory, and contain a reference to a next pool element, a flag to indicate that the pool element is reserved (for example, by containing either a null, or a reference to an iterator that has currently reserved this pool element), and a data block or field that points to a data or other resource to be cached, for example a connection or other software object.

For example, in a connection pool environment, each pool element can act as a holder for a particular type of connection, which in turn can be used to perform some work, e.g., at a database.

Figure 2:
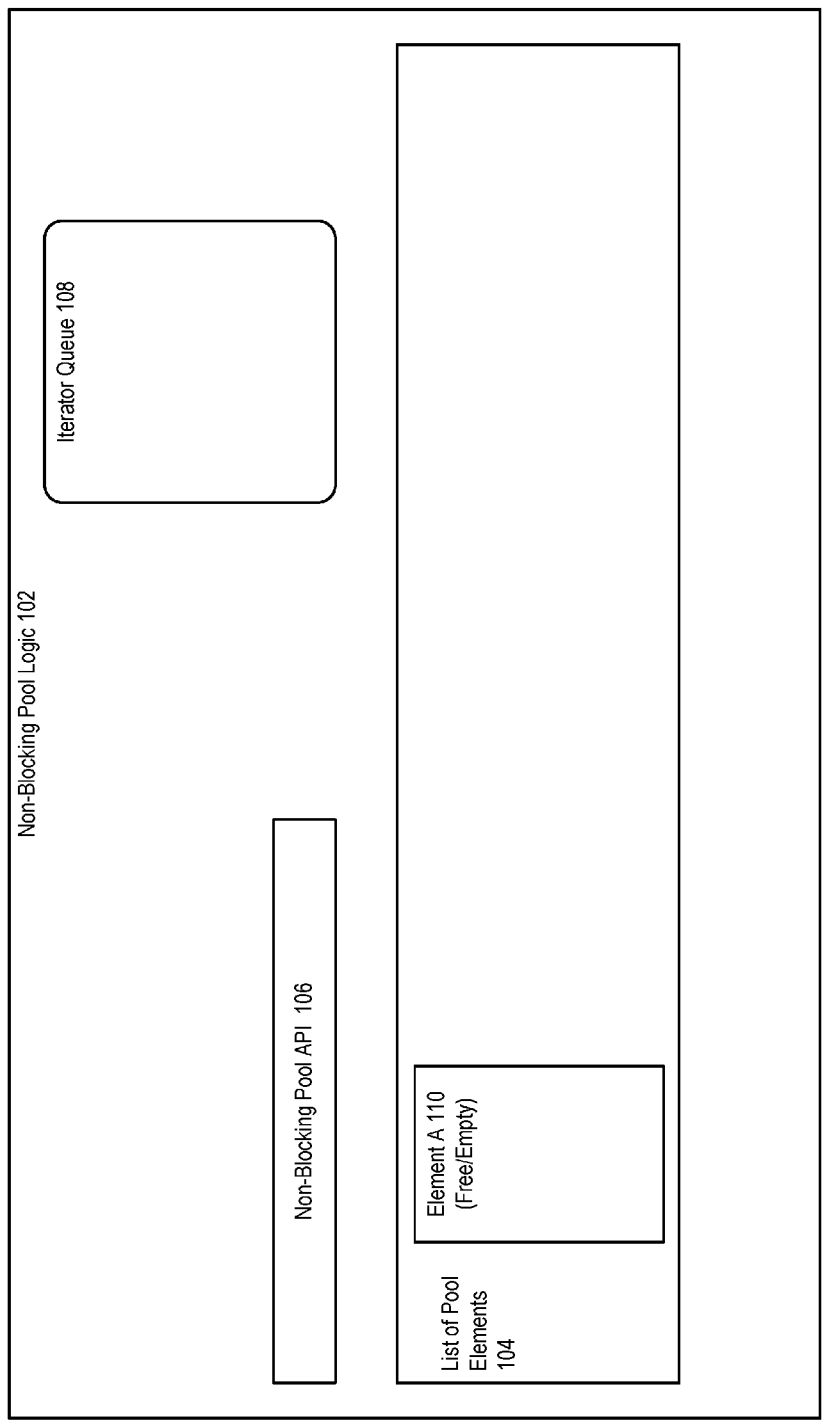
FIG. 2 further illustrates use of a non-blocking process, in accordance with an embodiment.

As illustrated in FIG. 2, a pool element A 110, which is inserted or otherwise added to the resource pool, can be initially provided as a free or empty pool element, such that the element is not currently associated with a particular data or other resource, nor is the element currently reserved by an application thread.

Figure 3:
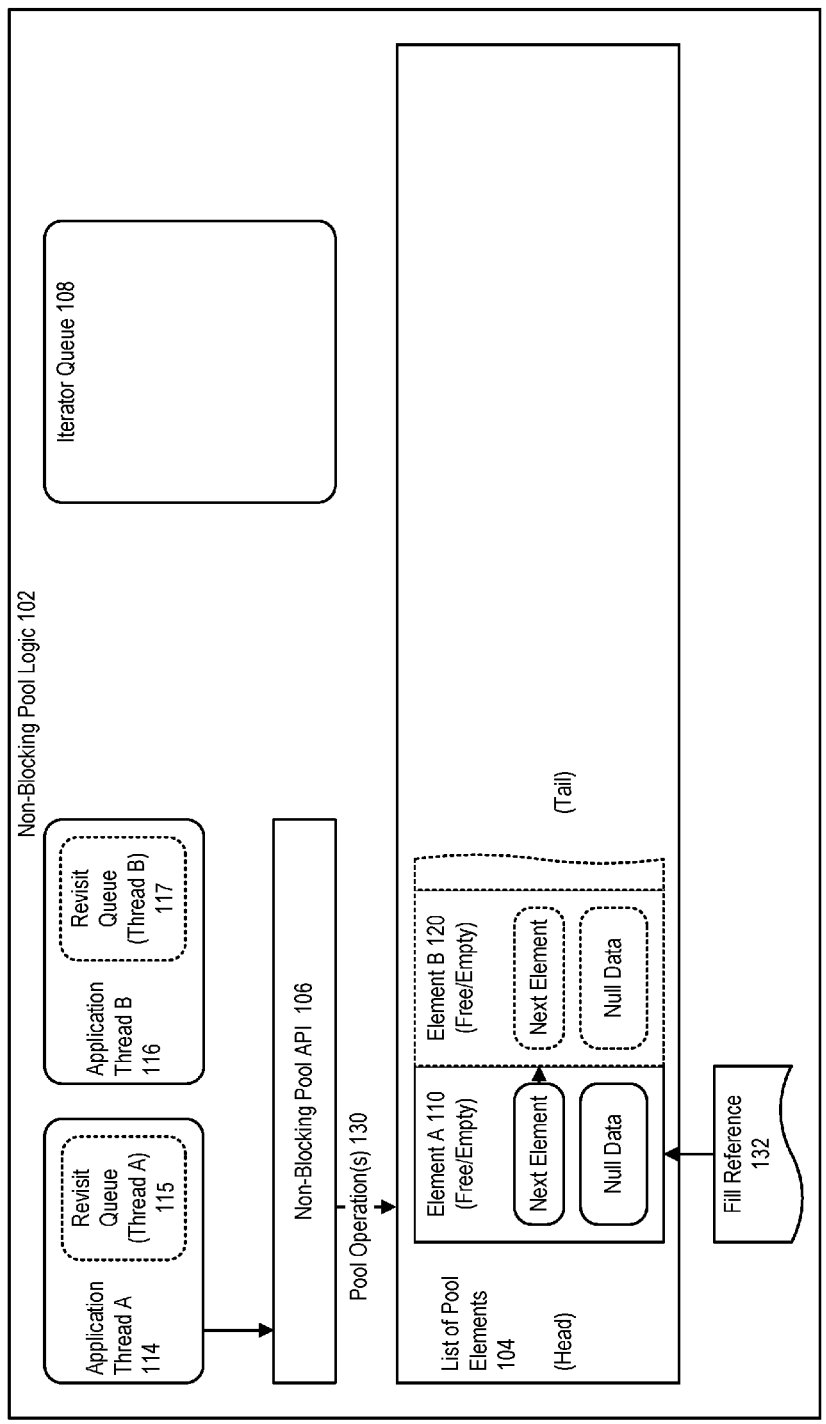
FIG. 3 further illustrates use of a non-blocking process, in accordance with an embodiment.

As illustrated in FIG. 3, additional pool elements including, for example, pool element B 120, can be similarly inserted or otherwise added to the resource pool, and can be similarly initially provided as free or empty pool elements.

In accordance with an embodiment, the list of pool elements within the resource pool can have a list head, and a list tail. When a thread associated with a calling application, for example one of application threads A 114 or B 116, each of which are associated with their own revisit queues 115, 117 respectively, wants to insert a pool element into the list, using one or more operations 130 at the pool's API, the non-blocking logic can parse through the one-directional list of pool elements to determine an appropriate insertion point.

In accordance with an embodiment, optionally a fill reference (fillRef) 132 can be used to point to the first vacant pool element (i.e., with a data field=null) in the list. Pool elements are generally not removed from the list, which is instead extended as necessary, and can be reserved on a one-by-one basis: if a pool element is already reserved, then it can be ignored, otherwise for a pool element to be reserved, the thread can examine the pool element's data field, and use it by modifying it accordingly.

In accordance with an embodiment, the system can use atomic references, implemented as compareAndSet operations, to ensure that another thread cannot insert a new pool element into the list at the same time, or compete to reserve the same pool element. In accordance with an embodiment, these atomic references can be translated into native hardware compare-and-swap spinlock instructions.

Figure 4:
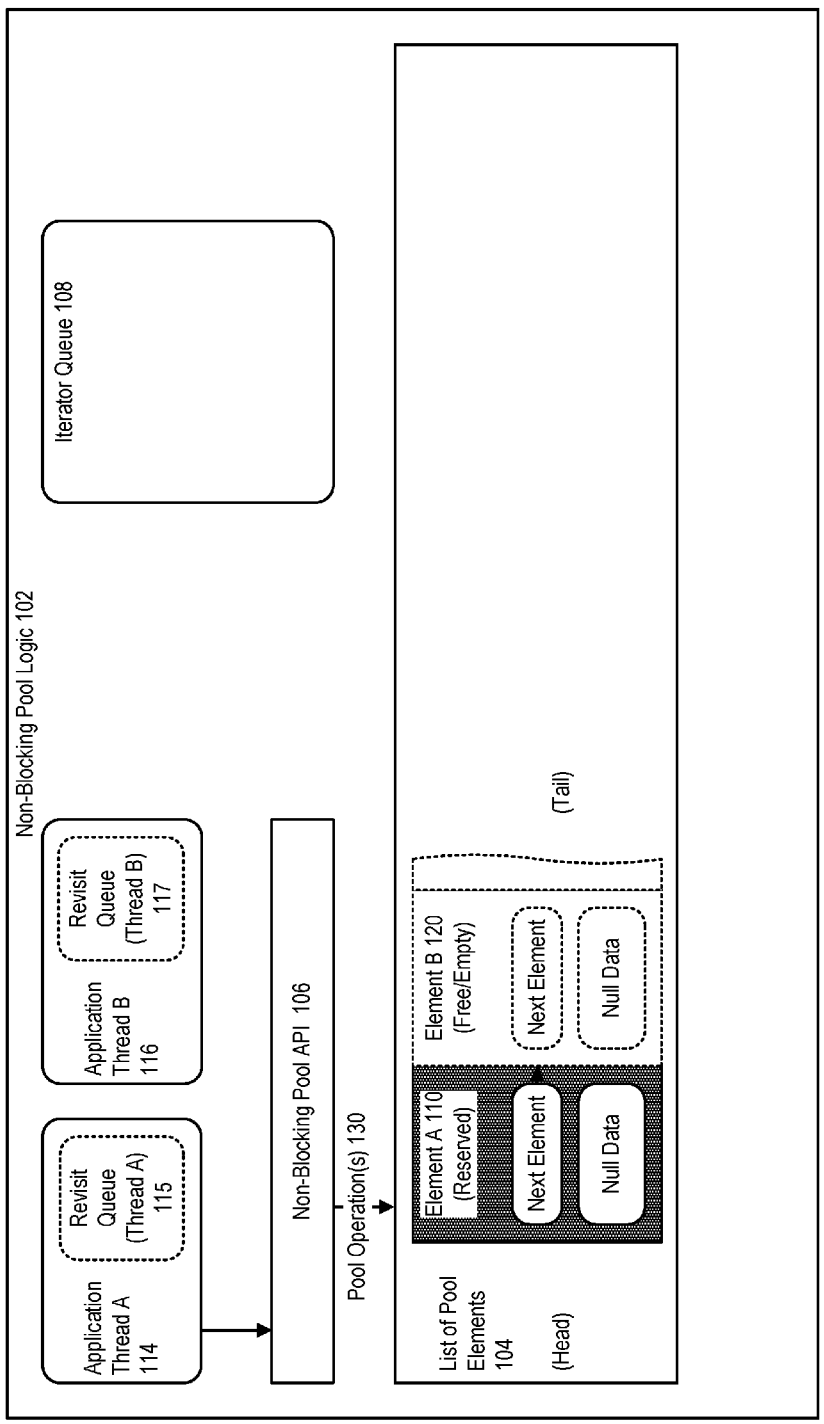
FIG. 4 further illustrates use of a non-blocking process, in accordance with an embodiment.

As illustrated in FIG. 4, a calling thread can reserve a particular pool element, in this example, pool element A, which can be flagged to indicate that the pool element is currently reserved.

In accordance with an embodiment, once a pool element is reserved, other threads can ignore that pool element during the reservation period. When a pool element is reserved by a thread, this does not necessarily mean that the element is checked-out or borrowed (for example, in the manner that a database connection might be checked-out or borrowed by a calling application, to perform some work at the database); but instead means that the thread is considering the pool element for its use, and may, or may not, continue to check-out, borrow, or otherwise use it. Other threads can skip that pool element for now, but they may return later and attempt to retrieve it.

In an exemplary embodiment, which supports the use of a connection pool to access database connections, during the borrowing of a connection, the system allows a thread to reserve a pool element, ensure the element is not currently borrowed, mark the element as borrowed, and then release the element, leaving it in the same resource pool. In such an environment, a pool element is removed from the pool only when that element's associated connection is closed. In this regard, the reservation of a pool element, e.g., one associated with a connection, is not the same as, for example, the checking out of that element's connection.

Figure 5:
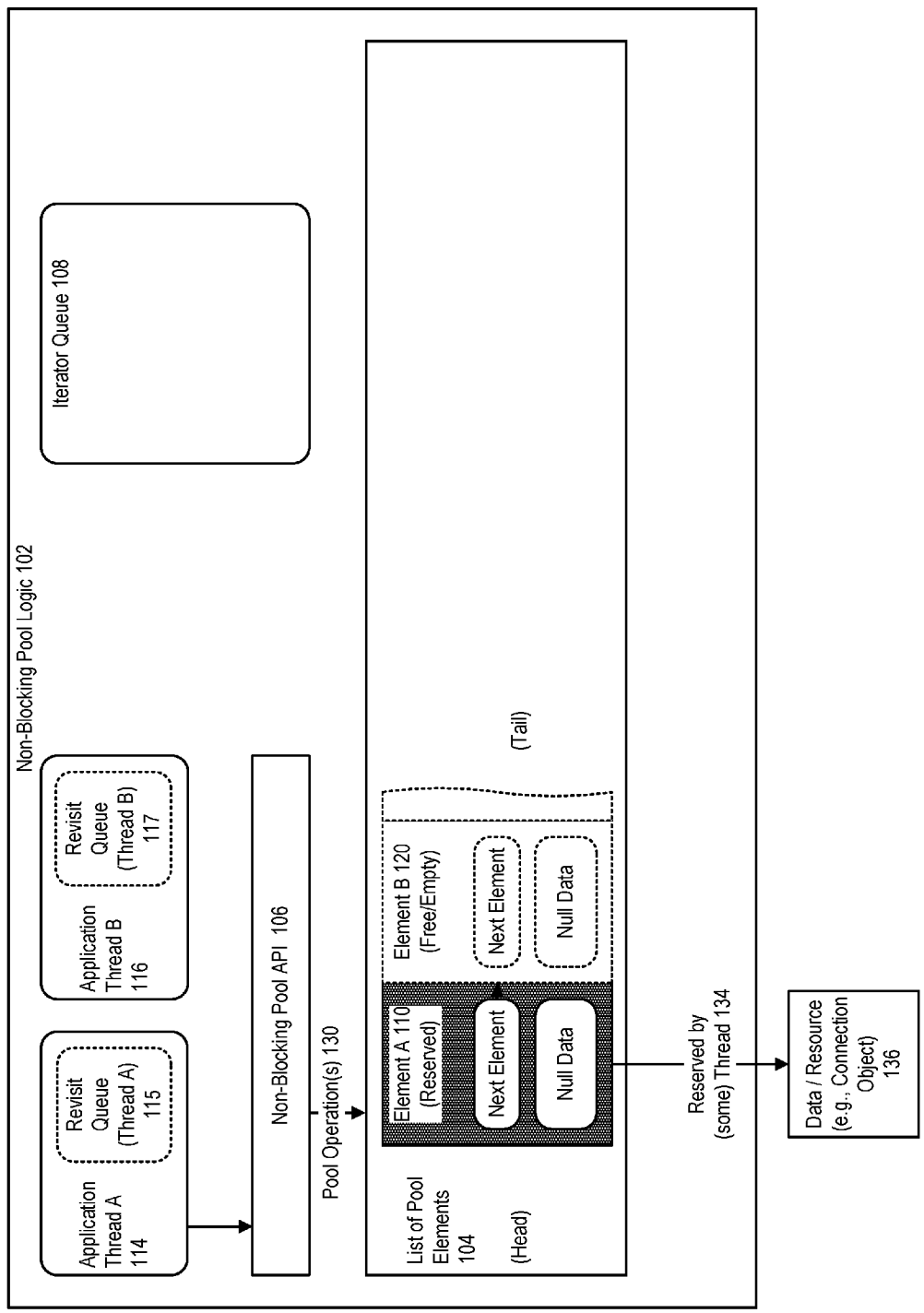
FIG. 5 further illustrates use of a non-blocking process, in accordance with an embodiment.

For example, as illustrated in FIG. 5, the pool element A can be reserved 134 by (some) thread, in order for that thread to examine whether the data or resource (e.g., connection object) 136 associated with that pool element, is potentially suitable for use by that thread, even though the underlying data or resource, in this example a connection, may ultimately not be checked-out by the thread.

Figure 6:
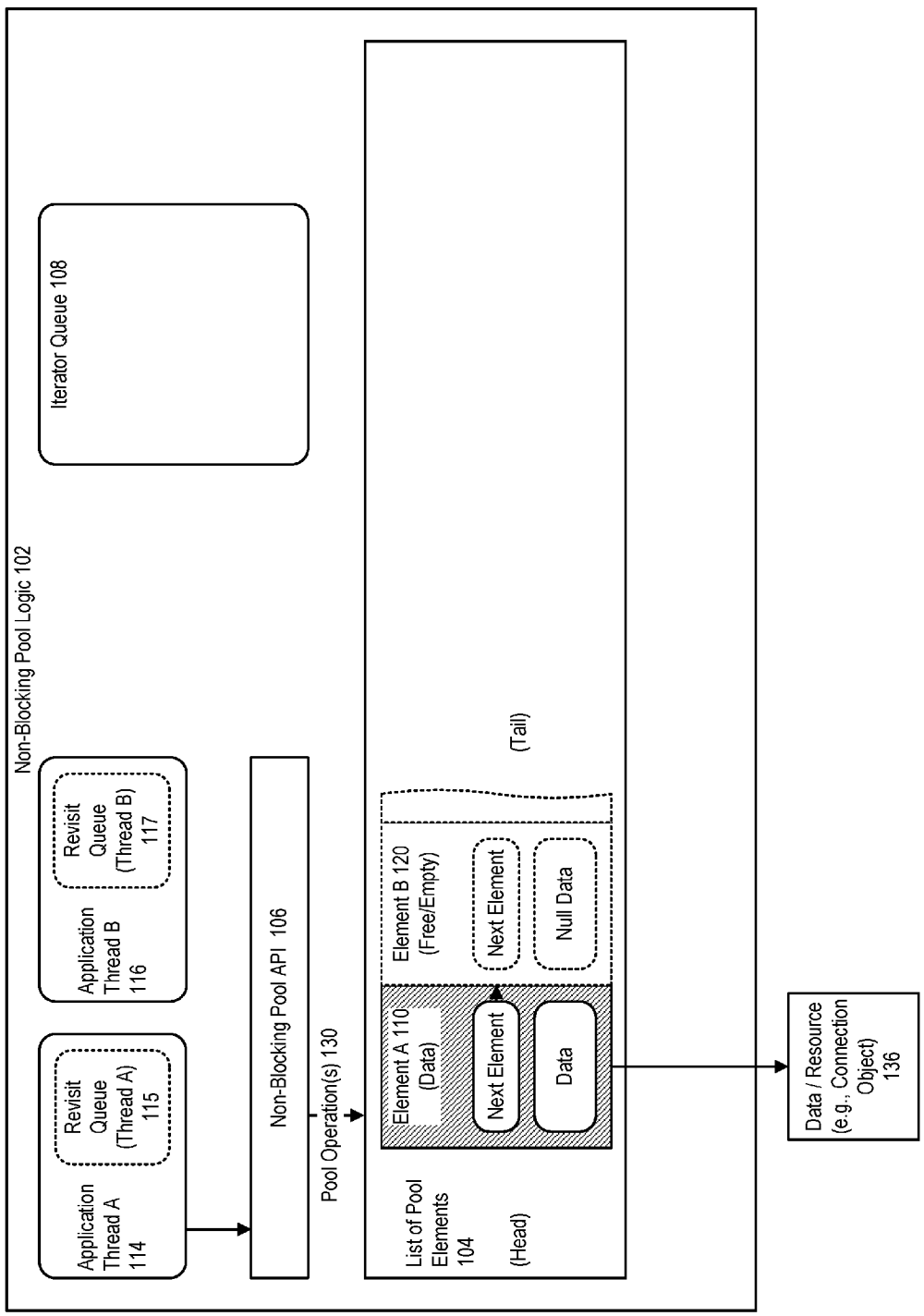
FIG. 6 further illustrates use of a non-blocking process, in accordance with an embodiment.

As illustrated in FIG. 6, if the pool element is suitable for further use by a reserving thread, then its data field can be updated accordingly, to reflect that it is being checked-out, borrowed, or otherwise being used by a particular thread, effectively removing that pool element from being made available within the resource pool.

In accordance with an embodiment, a thread reserves a pool element (e.g., one that may be associated with a particular connection) for a very short period of time, so it can check to see if it wants the data or resource associated with that pool element (e.g., the connection). In accordance with an embodiment, the action of reserving a pool element is an atomic operation and is very quick, which also allows a thread to quickly un-reserve it, and move on to consider a next pool element (e.g., a next connection), as necessary.

An advantage of this approach includes that, if a thread fails to reserve a pool element, the thread can simply note that it has not looked at that pool element, but can otherwise continue to perform useful work to determine if there is, perhaps, another pool element (e.g., connection) that may be suitable or satisfactory. Since there is no holding of threads, which continue to perform useful work, the described approach provides improved performance over the use of, for example, critical sections.

In accordance with an embodiment, a pool iteration operation is similar to that of insertion. To avoid having to parse through the whole resource pool, the fill reference can be optionally used as a clue to determine where to start parsing the list. Generally, the fill reference is used only for insertion once it points out for a vacant slot for insertion. In this sense, the fill reference operates as an optimization in providing a reference point to start an iteration with, but is not a required feature. For example, to perform a pool iteration, without using a fill reference, the system can simply start at the head (listhead) and parse through pool elements one by one, to the tail (listtail), ignoring empty slots. Other threads that cannot access a pool element at the same time can skip over that pool element, and make a note to revisit that pool element later if appropriate. When the system reaches the end of the list for a particular thread, it will have a list of any pool elements that particular thread had reserved, and potentially other pool elements which that particular thread had skipped since another thread had already reserved them.

In accordance with an embodiment, the above-described approach to iteration provides several benefits. For example, in some use cases, it may not be necessary for a thread to reserve a specific pool element, the thread may just be seeking something that is "good enough". In such use cases, a wait timeout can also be used to support e.g., those situations in which the system will give up waiting and return an error.

Additionally, the approach avoids the problem of thread starvation in situations having a lesser amount of resources. The iterator queue provides a way to access skipped pool elements in a fair way, since these pool elements are subject to being revisited, and many threads may want to revisit the same skipped pool element. Since thread scheduling is stochastic, and a thread might otherwise continually see these pool elements as reserved, that thread's progress could be retarded in some manner. In accordance with an embodiment, to avoid such thread starvation, the system forces threads to revisit in the order in which they first attempted to revisit the object, in a first-in-first-out manner.

Figure 7:
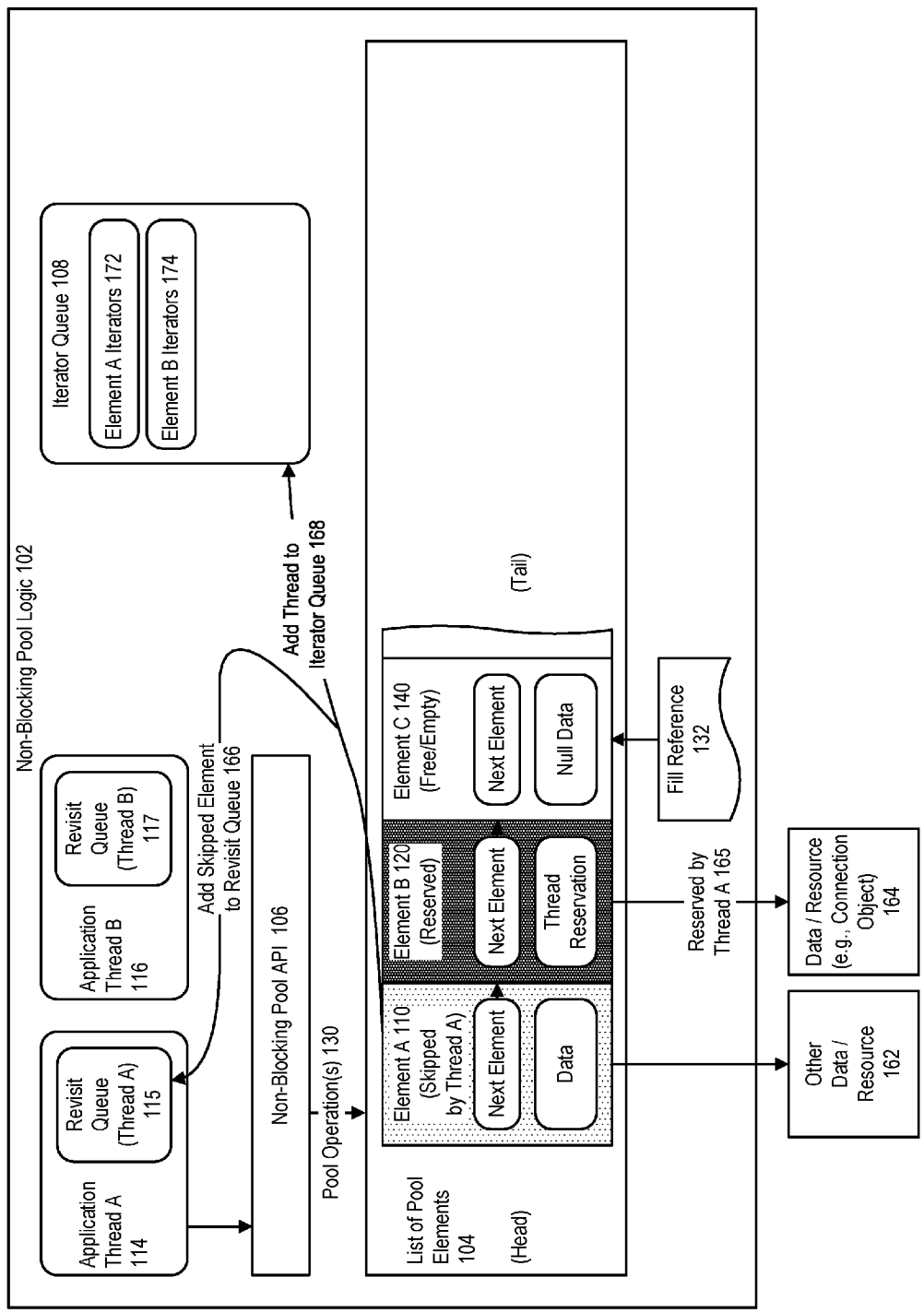
FIG. 7 further illustrates use of a non-blocking process, in accordance with an embodiment.

For example, as illustrated in FIG. 7, in accordance with an embodiment, the list of pool elements includes pool elements A and B as before, and now also includes pool element C 140, of which pool element A has already been reserved for use with a data or other resource 162.

As such, in this example, if an application thread A requires a pool element for use with a particular data or other resource (e.g., a connection object) 164, then pool element A is skipped, and the next pool element B is reserved 165, for use with that data or other resource. The skipped pool element is added to the revisit queue 166, for the requesting thread, and the thread is added 168 to the iterator queue, which in this example includes an indication of the iterators for pool element A 172, and those for pool element B 174. The fill reference, if used, is optionally updated to point to the next free pool element, in this example pool element C.

Figure 8:
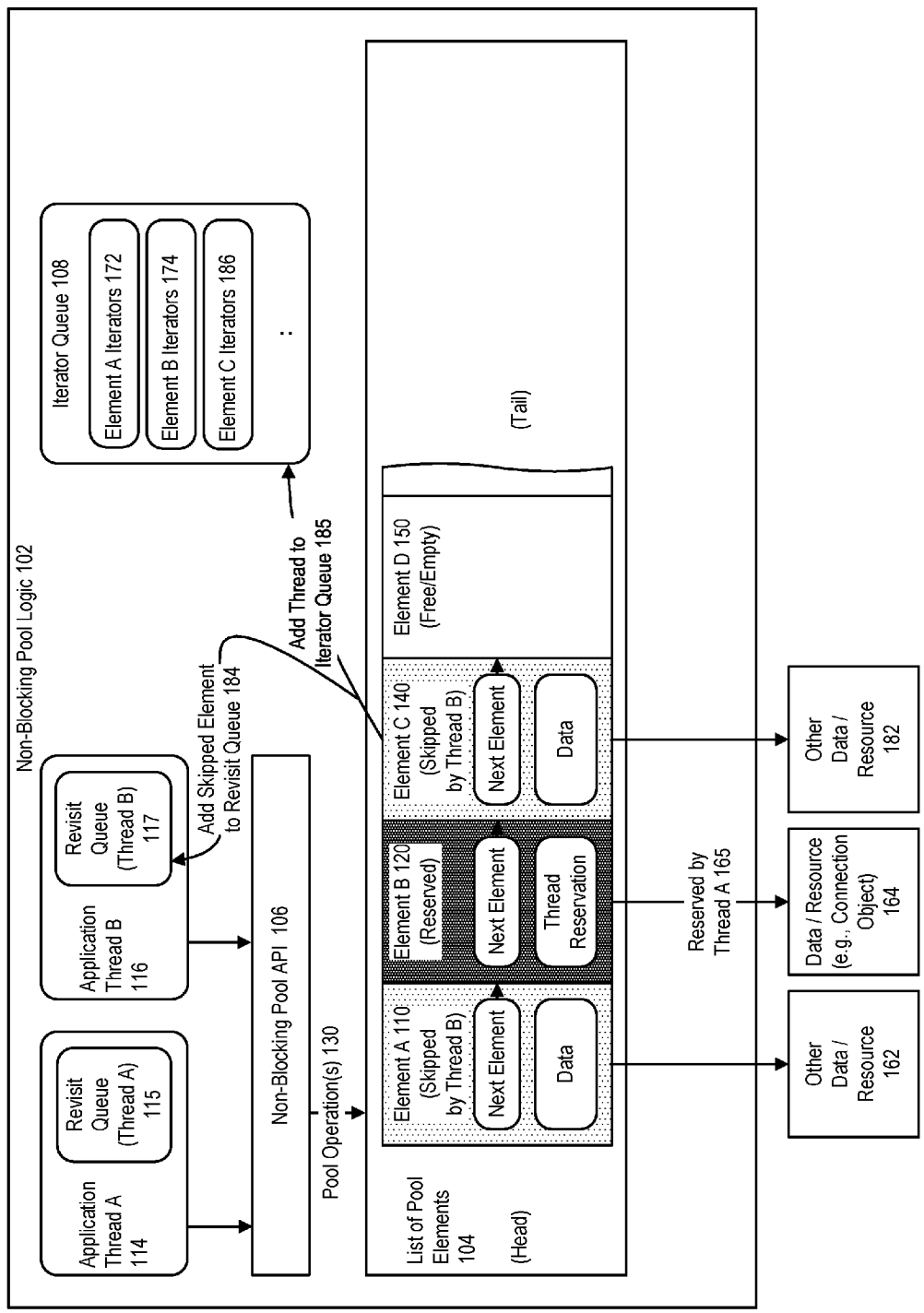
FIG. 8 further illustrates use of a non-blocking process, in accordance with an embodiment.

As illustrated in FIG. 8, which further illustrates the example described above, pool element C has now also been reserved for use with a resource 182. If an application thread B requires a pool element for use with a data or other resource, then pool element C is skipped, and another pool element D 150 is created, for use with that data or resource. The skipped pool element is similarly added to the revisit queue 184, for the requesting thread, and the thread is added 185 to the iterator queue, which in this example now includes an indication of the iterators for pool element C 186.

Figure 9:
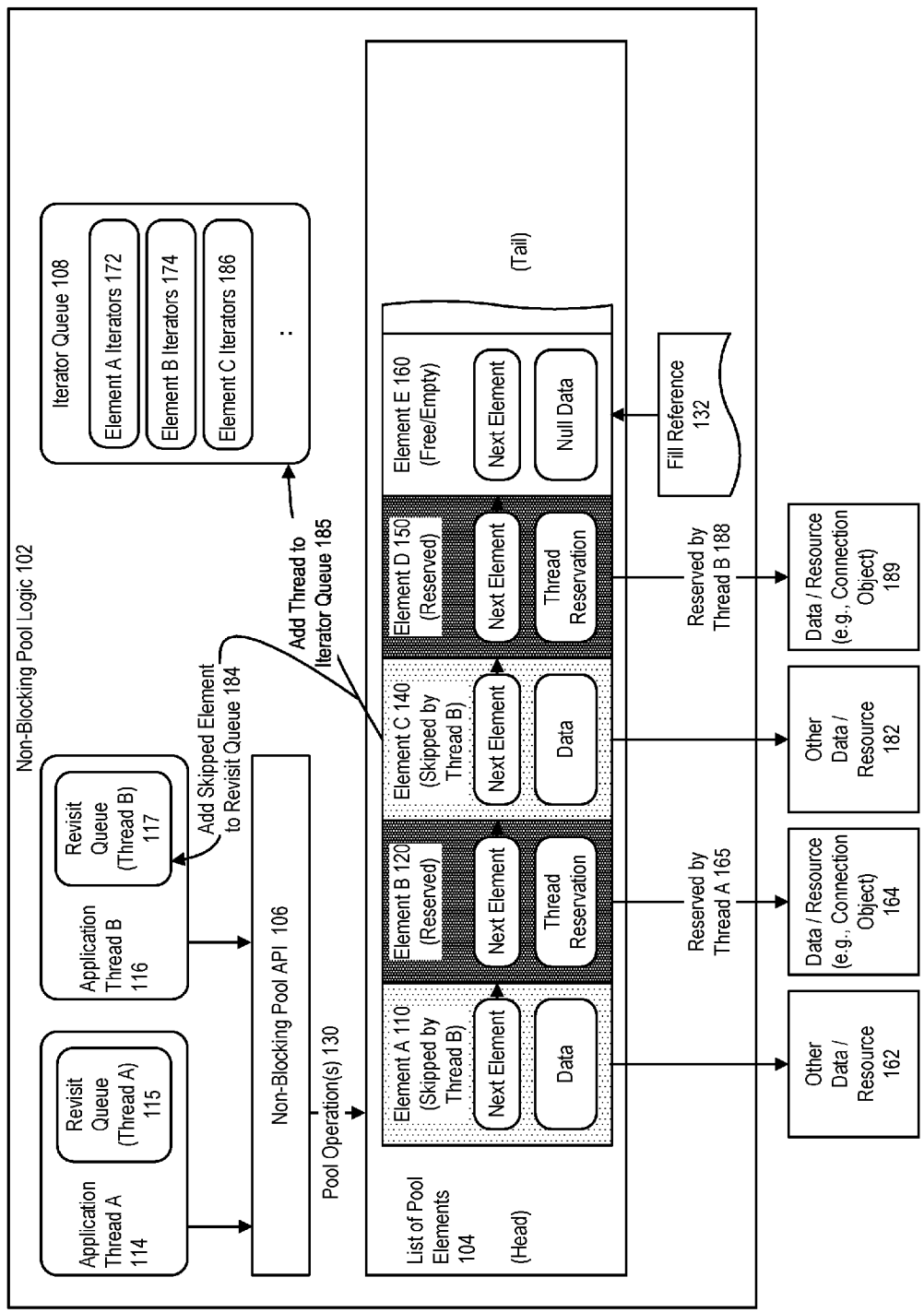
FIG. 9 further illustrates use of a non-blocking process, in accordance with an embodiment.

As illustrated in FIG. 9, the new pool element D can be reserved 188 for use with the data or other resource 189. The fill reference, if used, is again updated to point to the next free pool element, in this example pool element E 160.

Figure 10:
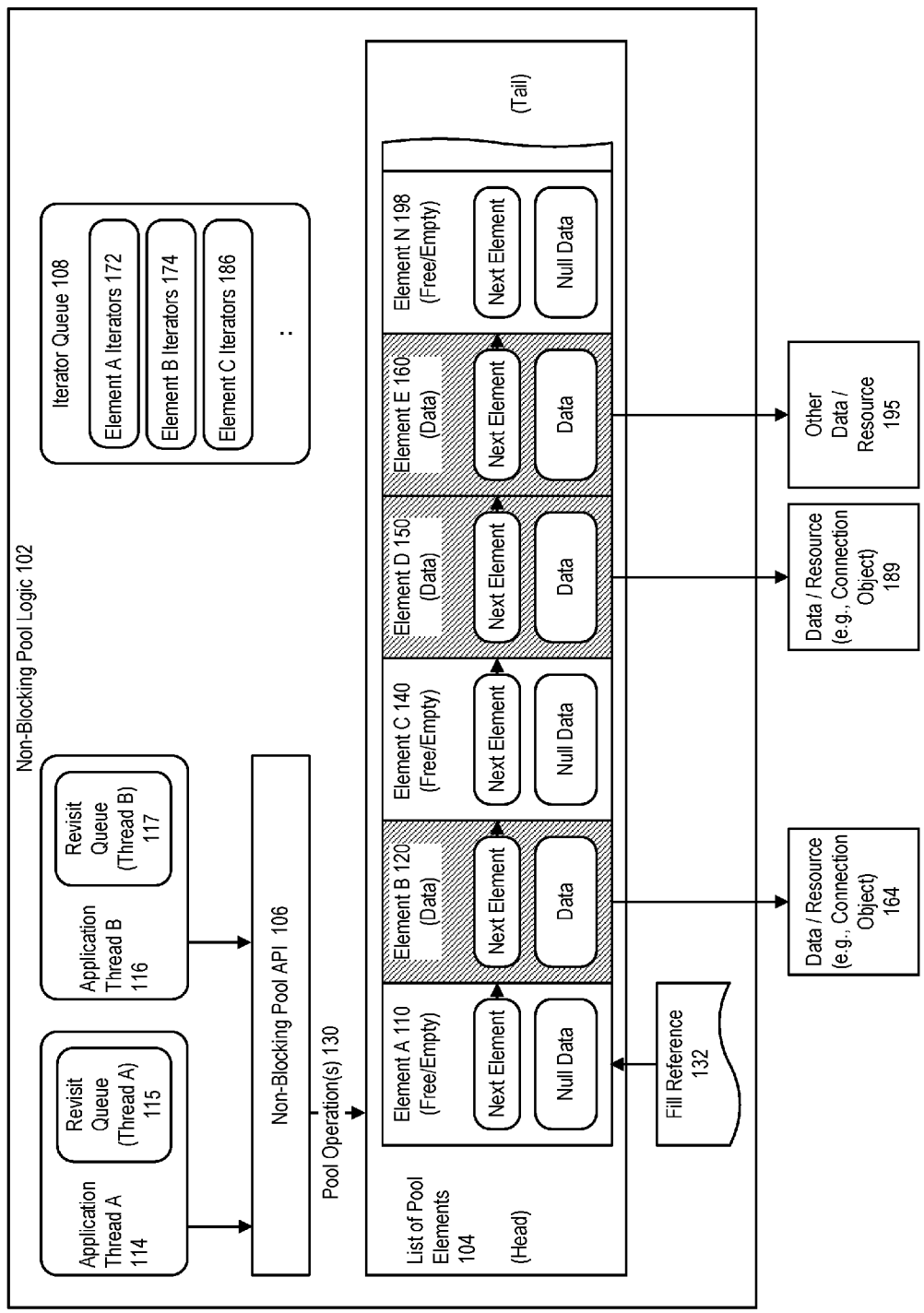
FIG. 10 further illustrates use of a non-blocking process, in accordance with an embodiment.

As illustrated in FIG. 10, which further illustrates the example described above, in accordance with an embodiment, as the list of pool elements becomes increasingly reserved, for use with additional data or other resources 195, then additional pool elements, such as pool element N 198 can be added, with the fill reference again optionally being updated, this time to the first free pool element in the list, which in this example is pool element A. In this example, each of elements B, D, and E, are currently associated with a data or other resource, for use by a thread, and are not currently available within the resource pool. Elements A, C, and N are neither associated with a data or other resource, nor are currently reserved by a thread; and are available for subsequent pool insertions.

The above approach works to cache pool elements that have special attributes, so can be useful in various use cases other than simply returning a first-available pool element.

For example, in a connection pool environment, a pool element can be associated with a connection label, and an application thread may want to find a particular pool element with a particular label—the pool elements themselves may all be different from one another. Additionally, as described above, in accordance with various embodiments, the system can support use cases in which a "good enough" match is desired, and not necessarily the only match, or the best match. Additionally, the system does not require a thread to wait for a best match if someone is using it, instead it can proceed to look for another or good enough match.

Exemplary Non-Blocking Process

In accordance with an embodiment, an exemplary process or algorithm is described hereunder, wherein the pool comprises a one-directional linked list of pool elements; and each pool element has its own iterator queue (another one-directional linked list containing references of threads that are going to revisit this pool element); and each participating thread has its own separate queue of pool elements to be revisited because they happened to be reserved during pool navigation by this thread.

List of Pool Elements

In accordance with an embodiment, a one-directional linked list of pool elements can be used. Each pool element has two atomic references: a reference for a next pool element (or null) and a reference to a thread that has reserved this pool element at this time (or null, if unreserved). The reference to an actual data (for example, a connection object or some other data or resource) is not atomic. As described above, optionally, a fill reference can be provided pointing to the first vacant pool element (data=null). Since the fill reference operates merely as an optimization hint, if it does not provide the correct reference, then this does not pose a problem, since in this case the wait-free pool can simply add a new slot in the end of a pool's list, instead of using an empty slot in the middle of the list. The fill reference is used and updated by insertion and removal operations. Initially, the fill reference points to the pool's list head.

In accordance with an embodiment, a pool element reservation operation checks (with compareAndSet) for a reserved contents and, if it is null, writes a current thread reference in it.

Alternatively, a pool element release operation checks (with compareAndSet) for a current thread reference, and if found, assigns a null. If a wrong thread reference has been found, then a failure is raised, because a pool element has to be released by the same thread.

In accordance with an embodiment, the above pool element operations are not included in the pool API as themselves, but are instead included as part of the insertion and iteration operations.

Pool Element Insertion

In accordance with an embodiment, a pool element insertion operation does the following:

1. From the fillRef reference, a thread goes toward the list tail, trying to reserve each next pool element and if successful, checks for a data field. If the data is null, i.e., a pool element is empty, fills it up with new data and releases a pool element. The insertion is done.

2. While moving towards the list tail, a thread checks a next (with compareAndSet) and if it null, assigns a newly created pool element with data re-filled with the data to be inserted.

3. The fillRef reference gets updated accordingly.

Pool Iteration

In accordance with an embodiment, a pool iteration operation does the following:

1. First pass: from the list head, go towards the list tail. Per each iteration, an attempt to reserve a next pool element (if it exists, i.e., a thread did not reach the list tail) is performed. A thread can fail because this pool element is reserved by another thread, in which case this iterator enqueues a current pool element in its own revisit queue, and enqueues itself into a queue of this pool element's iterator queue. If reserved, a pool element becomes accessible to a calling application. During the next move through a list, the current pool element gets released, and the next one gets reserved.

2. Second and further passes: going through a revisit queue, an iterator tries all pool elements scheduled for a revisit, checking for two things: whether the current iterator is on the head of the queue of pool iterators, and if a reserve operation is succeeded. Upon success, a thread reserves a pool element and dequeues an iterator from an iterators queue. Upon a failure, this pool element stays in a revisit queue for the next revisit pass, and an iterator stays in the iterator queue for this pool element.

Pool Element Removal

In accordance with an embodiment, a pool element removal operation can be done only on a currently reserved operation. The element's data field is assigned to null. The fill reference gets updated accordingly.

Pool Iterators

In accordance with an embodiment, each pool iterator corresponds to a participating thread, plus some other useful information for iterating through a pool, for example, a revisit queue.

Iterator Queue

In accordance with an embodiment, this is a one-directional list queuing iterators to revisit a pool element in a proper order.

An enqueue operation uses the compareAndSet operation for finding a list tail, and insert a new pool element on this tail. An operation can look for an appropriate iterator at the list head to revisit a pool element.

A dequeue operation removes an unneeded pool element from the list head. The dequeue operation does not need a spinlock operation on a head, because dequeue is performed by wiping out iterators from pool elements and the pool elements themselves can be removed occasionally, without synchronization.

Revisit Queue

In accordance with an embodiment, this is the thread local data, containing pool element to be revisited.

Exemplary Process Flows

Figure 11:
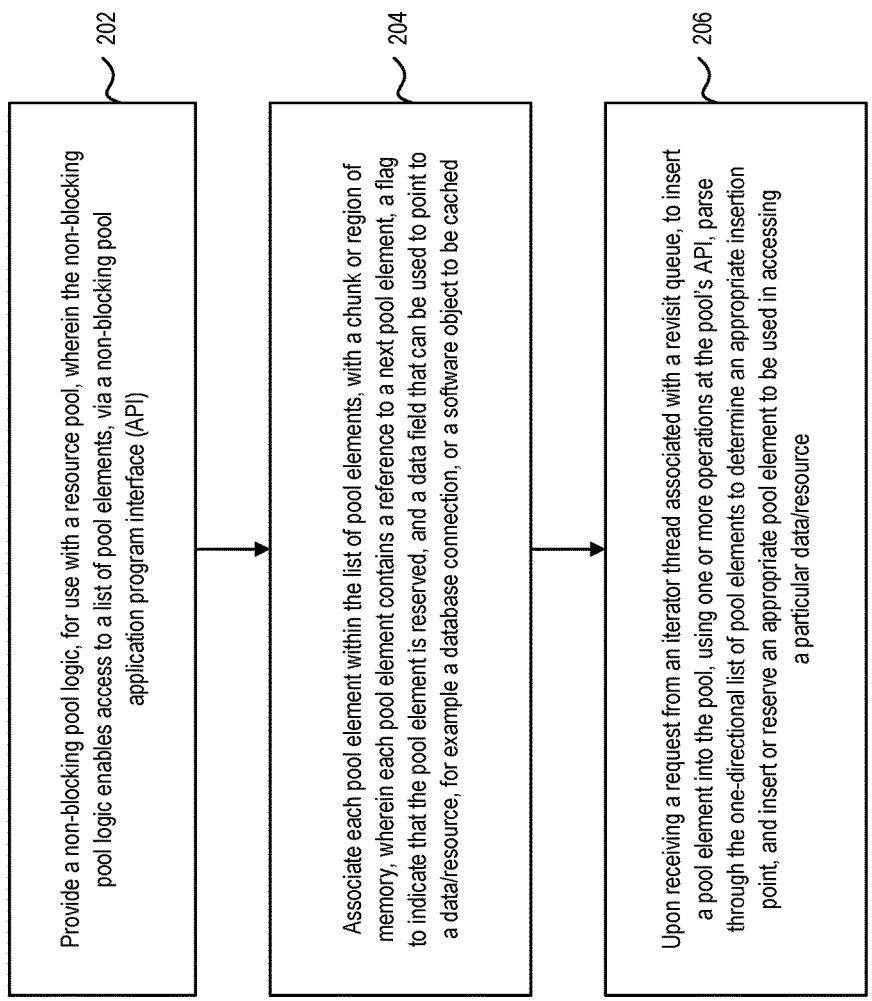
FIG. 11 illustrates a flowchart describing a non-blocking process, in accordance with an embodiment.

FIG. 11 illustrates a flowchart describing a non-blocking process, in accordance with an embodiment.

As illustrated in FIG. 11, in accordance with an embodiment, at step 202, a non-blocking pool logic is provided, for use with a resource pool, wherein the non-blocking pool logic enables access to a list of pool elements, via a non-blocking pool application program interface (API).

At step 204, each pool element within the list of pool elements is associated with a chunk or region of memory, wherein each pool element contains a reference to a next pool element, a flag to indicate that the pool element is reserved, and a data field that points to a data or other resource, such as, for example, a database connection or other software object to be cached.

At step 206, upon receiving a request from an iterator thread associated with a revisit queue, to insert a pool element into the pool, using one or more operations at the pool's API, the one-directional list of pool elements is parsed to determine an appropriate insertion point, and insert or reserve an appropriate pool element to be used in accessing a particular data or other resource.

Figure 12:
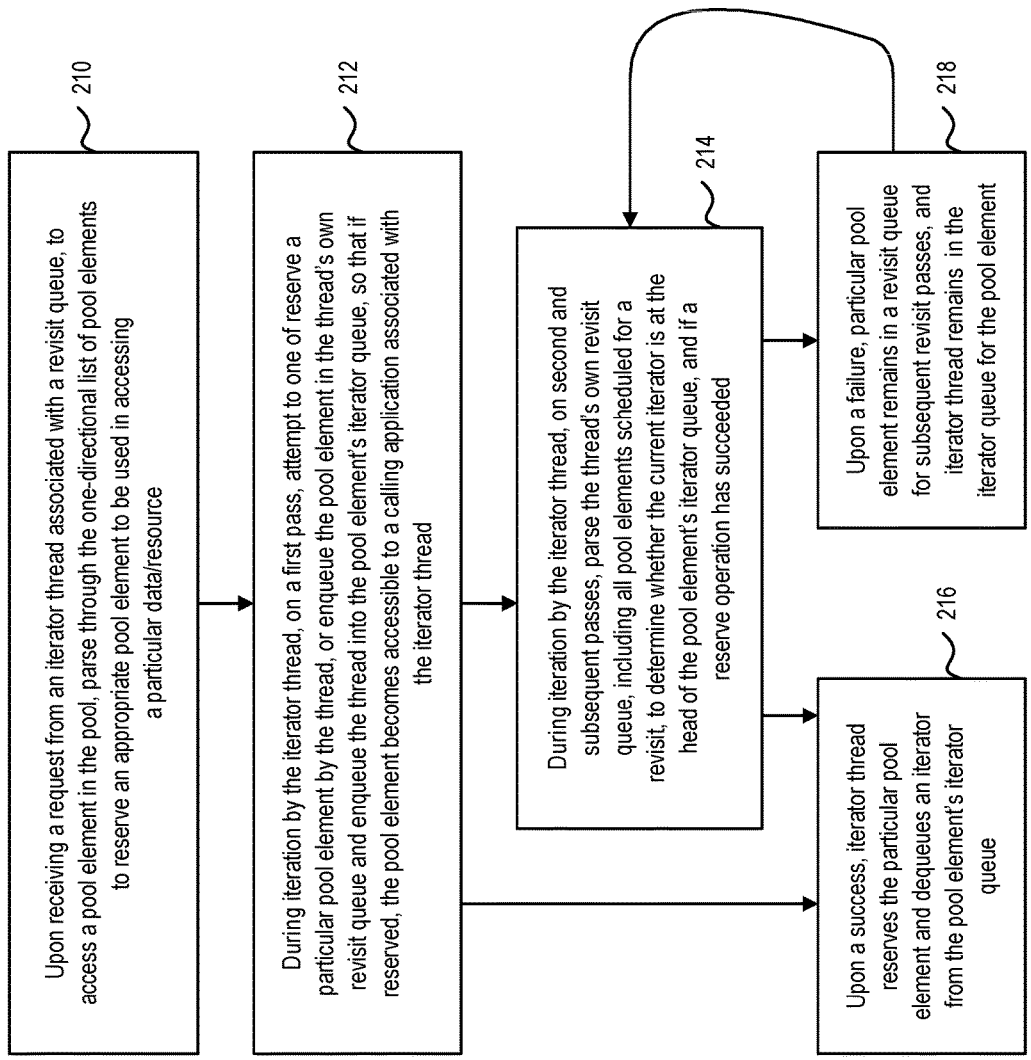
FIG. 12 further illustrates a flowchart describing a non-blocking process, in accordance with an embodiment.

FIG. 12 further illustrates a flowchart describing a non-blocking process, in accordance with an embodiment.

As illustrated in FIG. 12, in accordance with an embodiment, at step 210, upon receiving a request from an iterator thread associated with a revisit queue, to access a pool element in the pool, using one or more operations at the pool's API, the one-directional list of pool elements is parsed to reserve an appropriate pool element to be used in accessing a particular data or other resource.

At step 212, during iteration by the iterator thread, on a first pass, an attempt is made to one of reserve a particular pool element by the thread, or enqueue the pool element in the thread's own revisit queue and enqueue the thread into the pool element's iterator queue, so that if reserved, the pool element becomes accessible to a calling application associated with the iterator thread.

At step 214, during iteration by the iterator thread, on second and subsequent passes, the thread's own revisit queue is parsed, including all pool elements scheduled for a revisit, to determine whether the current iterator is at the head of the pool element's iterator queue, and if a reserve operation has succeeded.

At step 216, upon a success, the iterator thread reserves the particular pool element and dequeues an iterator from the pool element's iterator queue.

At step 218, upon a failure, the particular pool element remains in a revisit queue for subsequent revisit passes, and the iterator thread remains in the iterator queue for the pool element.

UCP Implementation

Figure 13:
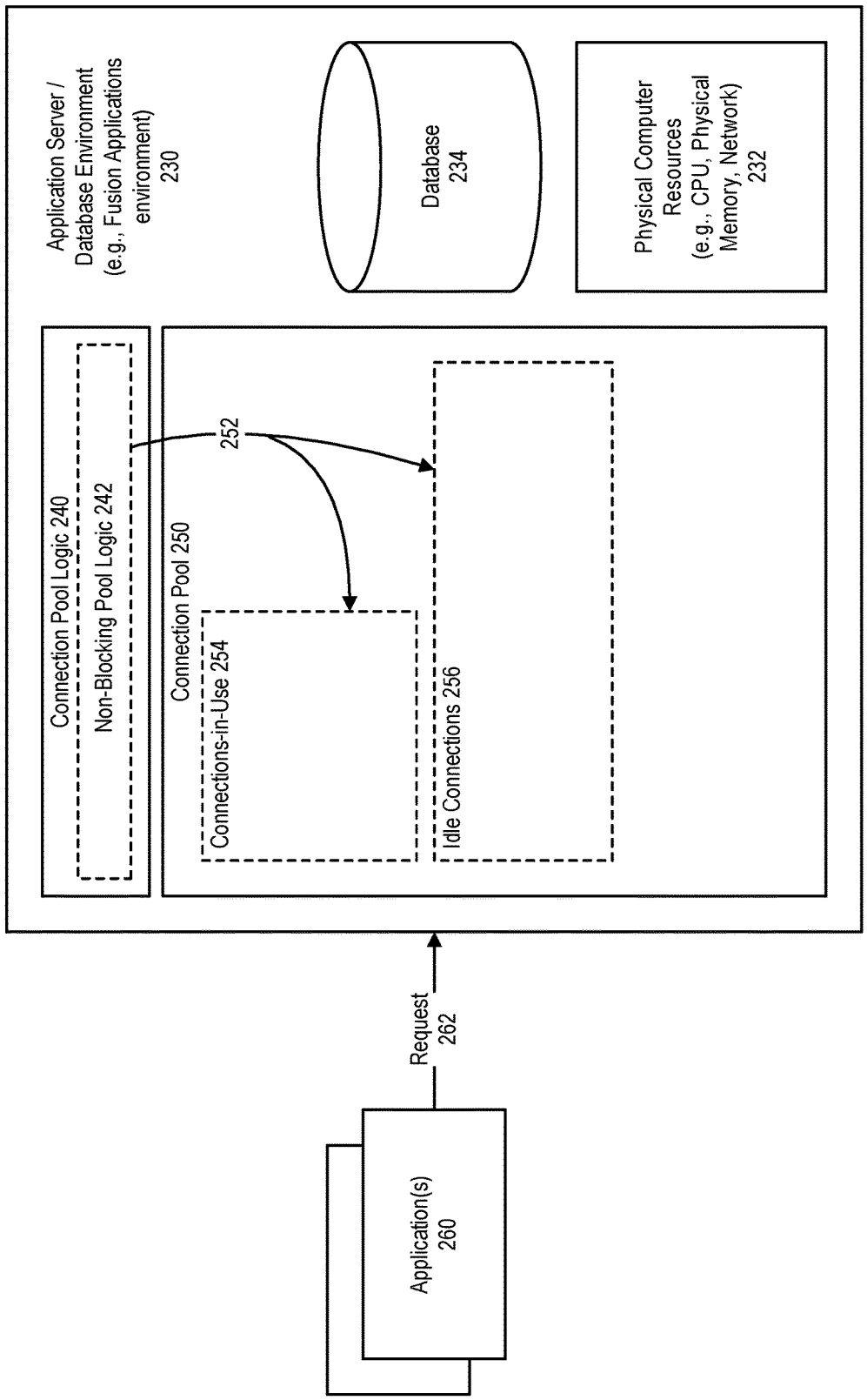
FIG. 13 illustrates an exemplary use of a non-blocking process with a connection pool environment, in accordance with an embodiment.

FIG. 13 illustrates an exemplary use of a non-blocking process with a connection pool environment, in accordance with an embodiment.

As illustrated in FIG. 13, in accordance with an embodiment, an application server/database environment 230, which includes physical computer resources 232 (e.g., processor/CPU, memory or network component), can include or provide access to a database 234. A connection pool logic 240, including a non-blocking pool logic 242, can control 252 the creation and allocation of objects within a connection pool 250, including connections that are currently in use 254, and connections that are idle 256. Labeling connections allows a software application 260 to attach name/value pairs to a connection. The calling application can then request 262 a connection with a desired label from the connection pool. By associating labels with connection states, an application can retrieve an already-initialized connection from the pool and avoid the time and cost of re-initialization.

Figure 14:
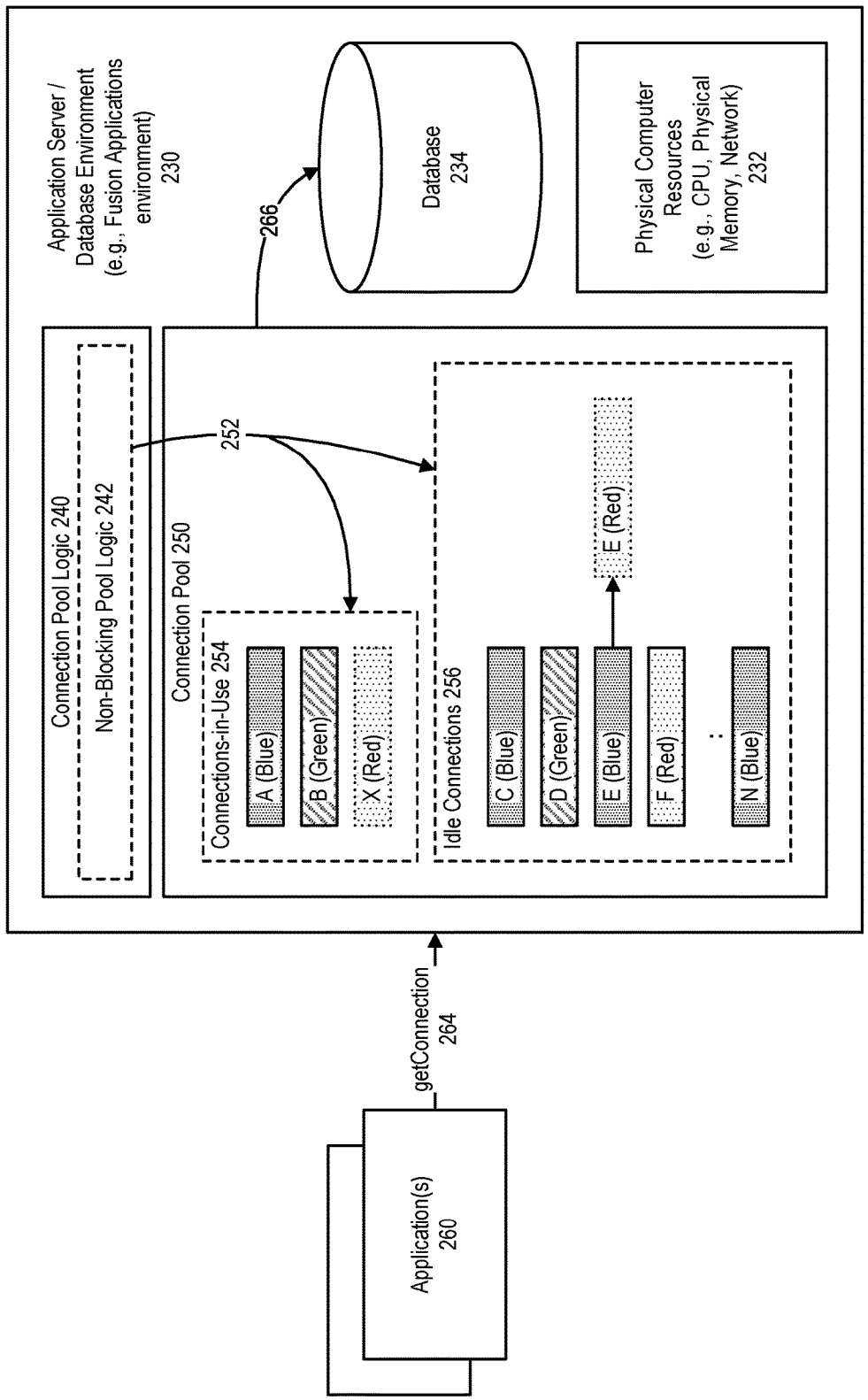
FIG. 14 further illustrates an exemplary use of a non-blocking process with a connection pool environment, in accordance with an embodiment.

FIG. 14 further illustrates an exemplary use of a non-blocking process with a connection pool environment, in accordance with an embodiment.

For example, the connection pool can include a plurality of connections, including connection A labeled (Blue) and connection B labeled (Green) that are currently in use, and connections C, D, E, F and N that are currently idle and which can be likewise labeled. If a software application wishes to make a request on the database, using a particular type of connection, it can make a getConnection request 264, say for a (Red) connection. In response, the connection pool logic can either provide an existing (Red) connection if one exists; create a new connection X (Red); or repurpose an existing connection, e.g., E (Red), to connect 266 to the database.

Figure 15:
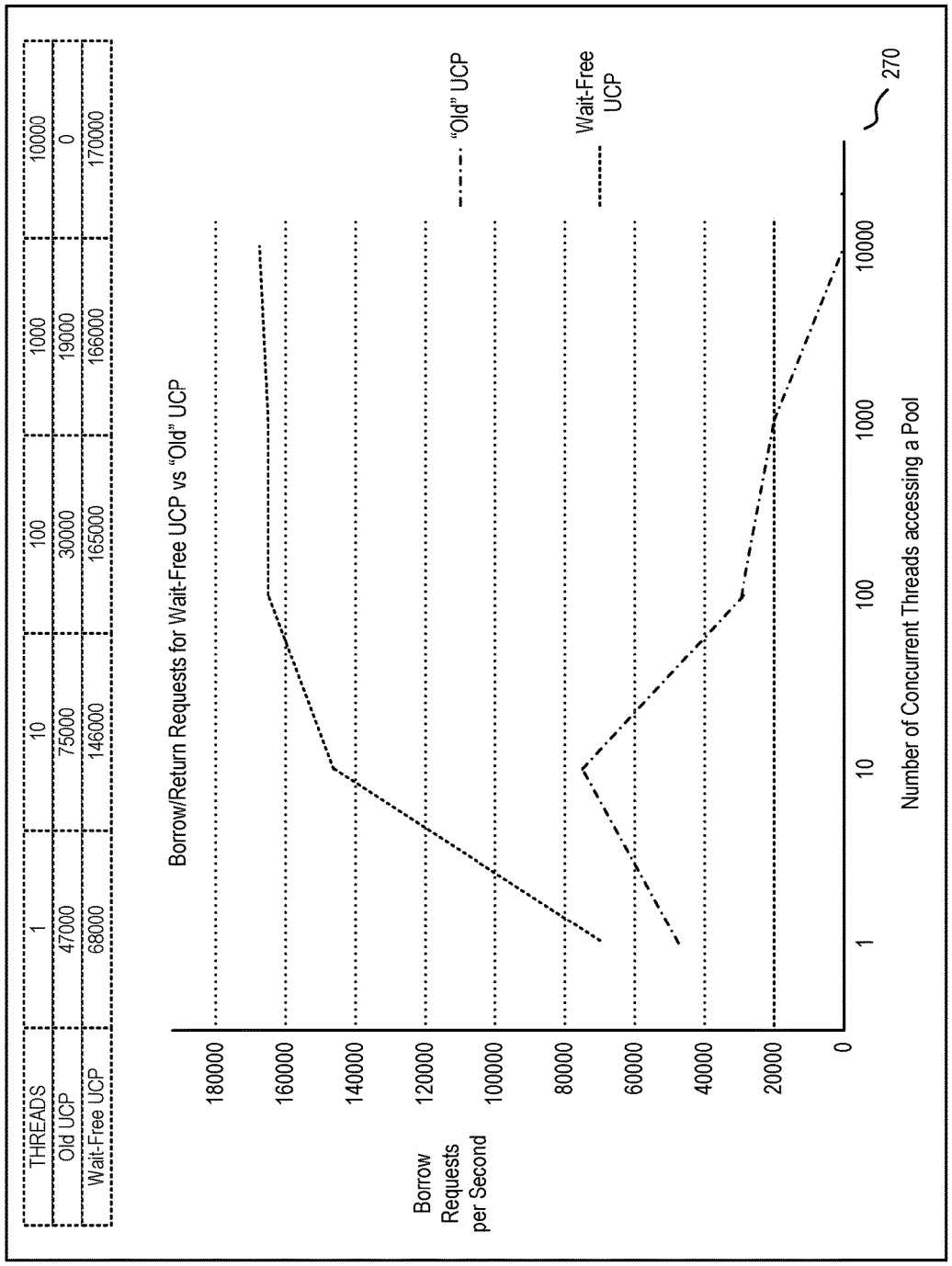
FIG. 15 illustrates the performance of an exemplary non-blocking process in a connection pool environment, in accordance with an embodiment.

FIG. 15 illustrates the performance of an exemplary non-blocking process in a connection pool environment, in accordance with an embodiment.

As illustrated in the example of FIG. 15, which illustrates a performance chart 270 that compares borrow/return request performance for a UCP environment which uses a non-blocking or wait-free process, versus an ("old" UCP) environment which does not use such a process, the amount of requests processed per second, as the number of concurrent threads accessing a pool increases, is improved when using a non-blocking process such as that described herein.

In the example illustrated in FIG. 15, the number of concurrent threads (shown on the X-axis) are competing for, in this instance, 6 physical connections, to borrow and immediately return back to the pool. The threads are not performing any further tasks on each connection, they simply borrow and return the connection. This example illustrates the speed of the borrow/return cycle, rather than the work performed by connections, as might be found in an environment in which a large amounts of threads are competing for a very limited amount of resources.

Figure 16:
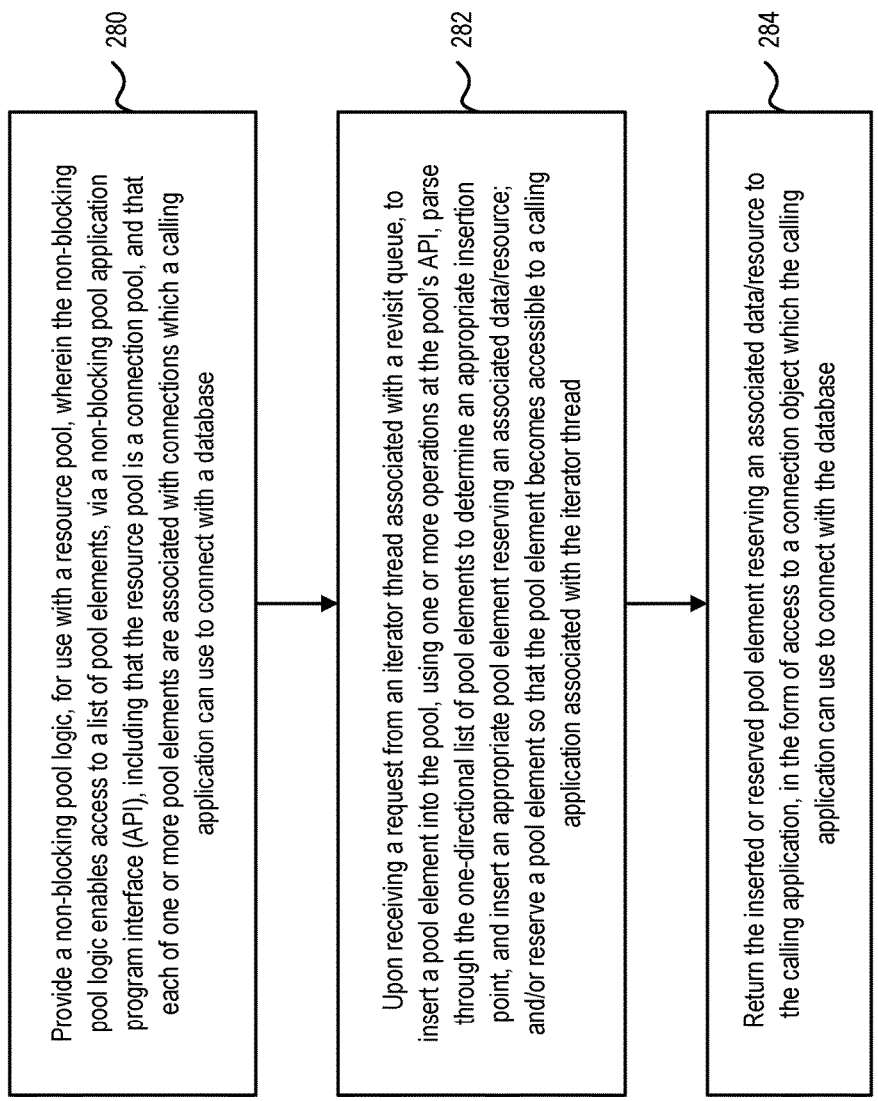
FIG. 16 illustrates an exemplary non-blocking process, for use in a connection pool environment, in accordance with an embodiment.

FIG. 16 illustrates an exemplary non-blocking process, for use in a connection pool environment, in accordance with an embodiment.

As illustrated in FIG. 16, in accordance with an embodiment, at step 280, a non-blocking pool logic is provided for use with a resource pool, wherein the non-blocking pool logic enables access to a list of pool elements, via a non-blocking pool application program interface (API), including that the resource pool is a connection pool, and that each of one or more pool elements are associated with connections which a calling application can use to connect with a database.

At step 282, upon receiving a request from an iterator thread associated with a revisit queue, to insert a pool element into the pool, using one or more operations at the pool's API, the system parses through the one-directional list of pool elements to determine an appropriate insertion point, and insert an appropriate pool element reserving an associated data or other resource; and/or reserve a pool element so that the pool element becomes accessible to a calling application associated with the iterator thread.

At step 284, the inserted or reserved pool element reserving an associated data or other resource is returned to the calling application, in the form of access to a connection object which the calling application can use to connect with the database.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. For example, while several of the examples described above illustrate the use of a non-blocking process in a connection pool environment, in accordance with various embodiments, the approach described herein can also be used with other types of computing environment.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system for use of a non-blocking process in a computing environment, comprising:
   one or more computers, including a processor and a non-blocking process executing thereon, that provides access to a resource pool associated with a plurality of pool elements, by a plurality of threads, including
      enabling pool elements to be selectively reserved, so that a reserving thread has access to a particular pool element for a duration of a reservation period, and
      during the reservation period, preventing other threads, of the plurality of threads, from accessing the particular pool element, and allowing the other threads to navigate through a remainder of the pool elements, reserving others of the plurality of pool elements;
   wherein each pool element is associated with a data or other resource; and
   wherein each of the plurality of threads access the resource pool using the non-blocking process to selectively reserve pool elements, including
      wherein each pool element is associated with an iterator queue that contains references of threads that will revisit the pool element, and
      wherein each thread is associated with a revisit queue, for use by the thread in examining pool elements and determining whether to use the data or other resource associated with those pool elements.

2. The system of claim 1, wherein each pool element is associated with a flag that indicates whether that pool element is reserved for use by a thread, and a pointer to the data or other resource associated with that pool element, that is usable by a thread to access the data or other resource associated with that pool element.

3. The system of claim 1, wherein the system uses atomic compare and set operations to check availability of and to reserve pool elements for use by the threads.

4. The system of claim 1, wherein during iteration of the resource pool by a thread to locate the particular pool element, if the particular pool element is reserved by another thread, then the particular pool element is added to the revisit queue associated with that thread.

5. The system of claim 1, wherein the system is used in a connection pool environment, including that each pool element is associated with a connection.

6. The system of claim 1, wherein the particular pool element is reserved by a thread to perform a check to determine whether the pool element should be borrowed by the thread for further use.

7. The system of claim 1, wherein the system is used in a connection pool environment, including that each pool element is associated with a connection usable by a software application.

8. A method for use of a non-blocking process in a computing environment, comprising:
  providing, at one or more computers, access to a resource pool associated with a plurality of pool elements, by a plurality of threads, using a non-blocking process, including
    enabling one or more pool elements to be selectively reserved, so that a reserving thread has access to a particular pool element for a duration of a reservation period, and
    during the reservation period, preventing other threads, of the plurality of threads, from accessing the particular pool element, and allowing the other threads to navigate through a remainder of the pool elements, reserving others of the plurality of pool elements;
  wherein each pool element is associated with a data or other resource; and
  wherein each of the plurality of threads access the resource pool using the non-blocking manner process to selectively reserve pool elements, including
    wherein each pool element is associated with an iterator queue that contains references of threads that will revisit the pool element, and
    wherein each thread is associated with a revisit queue, for use by the thread in determining whether to use the data or other resource associated with those pool elements.

9. The method of claim 8, wherein each pool element is associated with a flag that indicates whether that pool element is reserved for use by a thread, and a pointer to the data or other resource associated with that pool element, that is usable by a thread to access the data or other resource associated with that pool element.

10. The method of claim 8, further comprising using atomic compare and set operations to check availability of and to reserve pool elements for use by the threads.

11. The method of claim 8, wherein during iteration of the resource pool by a thread to locate the particular pool element, if the particular pool element is reserved by another thread, then the particular pool element is added to the revisit queue associated with that thread.

12. The method of claim 8, wherein the method is performed in a connection pool environment, including that each pool element is associated with a connection.

13. The method of claim 8, wherein the particular pool element is reserved by a thread to perform a check to determine whether the pool element should be borrowed by the thread for further use.

14. The method of claim 8, wherein the method is performed in a connection pool environment, including that each pool element is associated with a connection usable by a software application.

15. A non-transitory computer readable storage medium, including instructions stored thereon which when read and executed by one or more computers cause the one or more computers to perform a method comprising:
  providing access to a resource pool associated with a plurality of pool elements, by a plurality of threads, using a non-blocking process, including
    enabling one or more pool elements to be selectively reserved, so that a reserving thread has access to a particular pool element for a duration of a reservation period, and
    during the reservation period, preventing other threads, of the plurality of threads, from accessing the particular pool element, and allowing the other threads to navigate through a remainder of the pool elements, reserving others of the plurality of pool elements;
  wherein each pool element is associated with a data or other resource; and
  wherein each of the plurality of threads access the resource pool using the non-blocking process to selectively reserve pool elements, including
    wherein each pool element is associated with an iterator queue that contains references of threads that will revisit the pool element, and
    wherein each thread is associated with a revisit queue, for use by the thread in determining whether to use the data or other resource associated with those pool elements.

16. The non-transitory computer readable storage medium of claim 15, wherein each pool element is associated with a flag that indicates whether that pool element is reserved for use by a thread, and a pointer to the data or other resource associated with that pool element, that is usable by a thread to access the data or other resource associated with that pool element.

17. The non-transitory computer readable storage medium of claim 15, further comprising using atomic compare and set operations to check availability of and to reserve pool elements for use by the threads.

18. The non-transitory computer readable storage medium of claim 15, wherein during iteration of the resource pool by a thread to locate the particular pool element, if the particular pool element is reserved by another thread, then the particular pool element is added to the revisit queue associated with that thread.

19. The non-transitory computer readable storage medium of claim 15, wherein the system is used in a connection pool environment, including that each pool element is associated with a connection.

20. The non-transitory computer readable storage medium of claim 15, wherein the particular pool element is reserved by a thread to perform a check to determine whether the pool element should be borrowed by the thread for further use.

* * * * *

UNITED STATES PATENT AND TRADEMARK OFFICE
CERTIFICATE OF CORRECTION

PATENT NO. : 10,313,477 B2
APPLICATION NO. : 15/215372
DATED : June 4, 2019
INVENTOR(S) : Dolgov et al.

It is certified that error appears in the above-identified patent and that said Letters Patent is hereby corrected as shown below:

On the Title Page

Column 2, under Other Publications, Line 2, delete "an-introduction-o-lock-free-" and insert -- an-introduction-to-lock-free- --, therefor.

On page 2, Column 1, under Other Publications, Line 8, delete "Non-bocking_" and insert -- Non-blocking_ --, therefor.

In the Claims

In Column 13, Line 43, in Claim 8, before "process" delete "manner".

Signed and Sealed this
Tenth Day of November, 2020

Andrei Iancu
*Director of the United States Patent and Trademark Office*